(12) United States Patent
Michael et al.

(10) Patent No.: US 10,916,919 B2
(45) Date of Patent: Feb. 9, 2021

(54) KRYPTON-85-FREE SPARK GAP WITH A DISCHARGE PROBE

(71) Applicant: General Electric Company, Schenectady, NY (US)

(72) Inventors: Joseph Darryl Michael, Delmar, NY (US); Timothy John Sommerer, Ballston Spa, NY (US); Jason Fredrick Trotter, Glenville, NY (US); Mohamed Rahmane, Ballston Lake, NY (US); Karim Younsi, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 209 days.

(21) Appl. No.: 16/130,669

(22) Filed: Sep. 13, 2018

(65) Prior Publication Data
US 2019/0013651 A1    Jan. 10, 2019

Related U.S. Application Data

(63) Continuation-in-part of application No. 15/400,749, filed on Jan. 6, 2017.
(Continued)

(51) Int. Cl.
*H01T 1/20* (2006.01)
*H05H 1/52* (2006.01)
*F02C 7/266* (2006.01)

(52) U.S. Cl.
CPC ............ *H01T 1/20* (2013.01); *F02C 7/266* (2013.01); *H05H 1/52* (2013.01); *F05D 2220/323* (2013.01)

(58) Field of Classification Search
CPC ......... F02P 15/003; F02P 15/10; F02C 7/266; H01T 2/00; H01T 1/20; H01T 13/00; H01T 13/20; H01T 13/50
See application file for complete search history.

(56) References Cited

U.S. PATENT DOCUMENTS

| 3,350,602 A | 10/1967 | Germeshausen et al. |
| 4,046,123 A | 9/1977 | Jordan et al. |

(Continued)

FOREIGN PATENT DOCUMENTS

| FR | 2984028 A1 | 6/2013 |
| WO | 9850990 A1 | 11/1998 |

OTHER PUBLICATIONS

Savage "High reliability low jitter 80 kV pulse generator" (Year: 2009).*

(Continued)

*Primary Examiner* — Scott J Walthour
*Assistant Examiner* — William L Breazeal
(74) *Attorney, Agent, or Firm* — Fletcher Yoder, P.C.

(57) ABSTRACT

Embodiments of the present disclosure relate to a spark gap device that includes a first electrode having a first surface and a second electrode having a second surface offset from and facing the first surface. The spark gap device also includes a light source configured to emit light toward at least the first surface such that photons emitted by the light source when the spark gap is operated are incident on the first surface and cause electron emission from the first surface. The light source includes a discharge probe having a third electrode sealed in a tube filled with an inert gas. The spark gap device may not include a radioactive component.

20 Claims, 4 Drawing Sheets

Related U.S. Application Data

(60) Provisional application No. 62/376,426, filed on Aug. 18, 2016.

(56) References Cited

U.S. PATENT DOCUMENTS

| | | | |
|---|---|---|---|
| 4,484,106 A | | 11/1984 | Taylor |
| 4,890,040 A | * | 12/1989 | Gundersen ............... H03K 3/55 |
| | | | 315/155 |
| 5,057,740 A | | 10/1991 | Kirkman-Amemiya |
| 5,153,460 A | | 10/1992 | Bovino et al. |
| 7,336,472 B2 | | 2/2008 | Nerheim et al. |
| 7,579,770 B2 | | 8/2009 | Yang et al. |
| 9,806,501 B1 | | 10/2017 | Sommerer |
| 9,913,359 B1 | | 3/2018 | Michael et al. |
| 2007/0165351 A1 | | 7/2007 | Menke |
| 2012/0187871 A1 | * | 7/2012 | Fantz .................... H01J 61/12 |
| | | | 315/358 |
| 2013/0025255 A1 | | 1/2013 | Zizzo |
| 2016/0226225 A1 | * | 8/2016 | Girard .................. F02P 15/003 |
| 2018/0051633 A1 | | 2/2018 | Michael et al. |
| 2018/0054045 A1 | | 2/2018 | Michael et al. |

OTHER PUBLICATIONS

Harsch, K., et al.; "UV laser triggering of spark gaps by two-quantum photoelectric effect", Physics Letters A, vol. 55, Issue: 3, pp. 153-154, Dec. 1, 1975.

Golnabi, Hossein; "Discharge current development in two-electrode spark gap switches", IEEE Transactions on Plasma Science, vol. 30, Issue: 1, pp. 301-309, Feb. 2002.

Chung, Max; "UV LED Triggered Spark Gap", Plasma Science, 2007. ICOPS 2007. IEEE 34th International Conference on, pp. 344, Albuquerque, NM, Jun. 17-22, 2007.

Frey, W., et al.; "Gas-Insulated Self-Breakdown Spark Gaps: Aspects on Low-Scattering and Long-Lifetime Switching", Proceedings of the 2nd Euro-Asian Pulsed Power Conference, vol. 115, Vilnius, Lithuani, Sep. 22-26, 2008.

Sozer, Esin B., et al.; "Investigation of UV LEDs for compact back-lighted thyratron triggering", 2009 IEEE Pulsed Power Conference, pp. 610-612, Washington, DC, Jun. 28-Jul. 2, 2009.

EP Office Action, EP Application 17185898.8; dated Jul. 22, 2019, pp. 1-5.

* cited by examiner

KRYPTON-85-FREE SPARK GAP WITH A DISCHARGE PROBE

CROSS-REFERENCE TO RELATED APPLICATIONS

This application is a continuation in part of U.S. patent application Ser. No. 15/400,749, entitled "KRYPTON-85-FREE SPARK GAP WITH A DISCHARGE PROBE," filed Jan. 6, 2017, which claims priority to and benefit of U.S. Provisional Patent Application Ser. No. 62/376,426, entitled "KRYPTON85-FREE SPARK GAP WITH A GLOW DISCHARGE," filed Aug. 18, 2016, which are herein incorporated by reference in their entireties.

BACKGROUND

The subject matter disclosed herein relates to spark gaps for use in ignition systems or other suitable systems.

Spark gaps are passive, two-terminal switches that are open when the voltage across the terminals is low, and then close when the voltage across the terminals exceeds a design value (e.g., 3 kV). The spark gap then re-opens when the current has fallen to a low level or when most of the energy from the voltage source is dissipated. Internally, the current is carried between two metal electrodes that are separated by a small 'gap' (~mm) that is filled with a gas or gas mixture (e.g., $Ar$—$H_2$—$Kr$) near atmospheric pressure. The gas is ordinarily insulating, but it becomes a conducting plasma 'spark' when the voltage between the two electrodes exceeds the design value which corresponds to the breakdown voltage.

For various applications, one parameter of interest may be the time between when a sufficient voltage is applied to the spark gap and the time at which it becomes conducting. This time corresponds to the 'breakdown' processes that initiate the transition of the gas from an insulator to a conductor.

There is an idealized but useful view of electrical breakdown as a two-step process—a 'statistical' time for the first electron to appear, followed by a 'formative' time for the electrons to 'avalanche' to a highly conductive state. A free electron appears at some time and location in the gap, and is accelerated by the electric field that is created by the potential difference between the electrodes. Once the electron gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and the first free electron should be created in preferred locations (e.g., at or near the negative electrode) for maximum effectiveness.

The time required for the second (avalanching) process is the 'formative time lag'. It is generally short and can be practically ignored. Thus, the time required for the first process (the initial electron) is the 'statistical time lag', and it is this 'first electron problem' that is of primary interest in practice. In some devices such as laboratory apparatus or large electric discharge lamps the 'first electron problem' is solved by doing nothing more than waiting for a cosmic ray to create a free electron when it collides with a gas atom, gas molecule, or surface within the device. Electron-ion pairs are always being created at a given rate in atmospheric air by energetic cosmic rays that can easily penetrate into gas volumes within devices and structures. A Geiger counter is an example of a device that detects such events.

However, the ubiquitous cosmic-ray process cannot be relied upon to create effective free electrons within a required timeframe that may be needed for reliable operation of many devices that incorporate a spark gap. In particular, for device employing a spark gap the timeframe is typically too short to rely on a cosmic ray based process because the interaction volume (the region between the electrodes) is relatively small.

Instead, the conventional approach to solving the first-electron problem in a spark gap context (as well as in other devices dealing with similar issues, such as small electric discharge lamps) is to add a source of radioactivity, for example in the form of radioactive krypton-85 (e.g., $^{85}Kr$), which undergoes beta decay to emit an energetic (687 keV) electron, to generate seed electrons and reduce statistical time-lag to acceptable values. Other radioactive materials such as tritium or thorium are sometimes used. The addition of a radioactive component is sometimes referred to as 'radioactive prompting'.

However, radioactive materials, even at trace level, are generally not desirable in a component or product because these materials add to of the cost of manufacturing, handling, and shipping.

BRIEF DESCRIPTION

In one embodiment, a spark gap device includes a first electrode having a first surface, a second electrode having a second surface offset from and facing the first surface, and a discharge probe configured to emit light toward at least the first surface such that photons emitted by the light source when the spark gap is operated are incident on the first surface and cause electron emission from the first surface.

In another embodiment, an ignition device includes one or more igniters configured to ignite a fuel stream or vapor during operation and one or more exciter components, each connected to a respective igniter, where each exciter component includes a spark gap having a discharge probe as a light source to generate free electrons when the spark gap is operated.

In still further embodiments, a method for generating a conductive plasma includes applying a voltage across a spark gap having a first electrode and a second electrode, where the first electrode includes a surface facing the second electrode, generating free electrons at the surface of the first electrode using a discharge probe as a light source, and subsequent to generating the free electrons, generating the conductive plasma across the spark gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present approach relates to spark gaps, such as those used in ignition systems for combustion engines, as well as in other contexts such as surge protection, power switching, and so forth.

Figure 1:
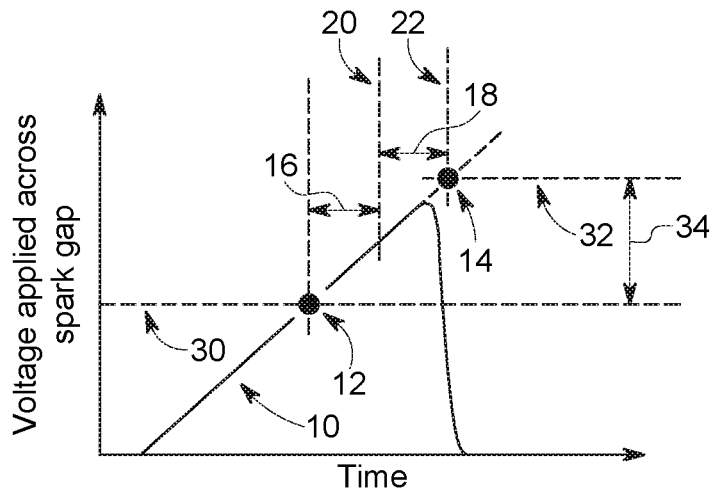
FIG. 1 depicts voltage with respect to time in spark gap operation so as to illustrate concepts related to the present approach.

By way of introduction to the concepts and terminology used herein, an illustrative example of the operation of a spark gap is illustrated in FIG. 1. In this example, if the voltage waveform 10 is a ramp, the rate of voltage rise is 6 kV/s, and the desired voltage rating is 3±0.05 kV, then the total time from Point 12 (the time sufficient voltage for the spark gap to fire is reached) to Point 14 (the time when the spark gap is closed) should be no more than 17 ms. This time corresponds to the 'breakdown' processes that initiate the transition of the gas from an insulator to a conductor.

As can be appreciated from FIG. 1, the breakdown voltage 22 depends on the intrinsic properties of the spark-gap, as well as the voltage ramp 10 that is defined by other portions of the circuit. If the rate of voltage rise is slower, then the voltage-rise between Point 12 and Point 14 is reduced, so Point 12 is sometimes referred to as the 'intrinsic' breakdown voltage of the spark gap, because it does not depend on the circuit properties.

As noted above, an idealized but useful view of electrical breakdown is to view it as a two-step process, with a first component corresponding to a 'statistical' time 16 for the first electron to appear (at time 20), followed by a second component corresponding to a 'formative' time 18 for the electrons to 'avalanche' to a highly conductive state, occurring at time 22 when the spark gap closes. In this example, the difference between the voltage 30 sufficient for the spark gap to fire and the voltage 32 at which the spark gap closes is the variation 34 in gap voltage.

In terms of the underlying concept, a free electron appears at some time and location in the gas surrounding the spark gap, and is accelerated by the electric field that is created by the potential difference between the electrodes. Once it gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first electrons are preferably created in certain locations (e.g., near the negative electrode or cathode) for maximum effectiveness.

As noted above, the time 16 required for the first process (i.e., the release of the initial electron) is referred to as the 'statistical time lag', and it is this 'first electron problem' that is addressed in the present approach. The present approach solves the first-electron problem in the spark gap (i.e., the statistical time lag) without relying on the traditional approach of providing a source of ionizing radiation (e.g., $^{85}$Kr), which is generally undesirable, and thus does not employ 'radioactive prompting'. Similarly, the present approach does not rely solely on the effects of cosmic-rays, for generation of the initial electrons as such rays typically are insufficient to generate first electrons at a sufficient rate needed in a spark gap ignition context (or other industrial or mechanical context).

With the preceding introduction in mind, in the present approach $^{85}$Kr is eliminated from the spark gap and the photo-electric effect is instead employed to generate seed electrons. By way of example, in one implementation, a light source (e.g., a discharge probe that includes electrodes in a sealed tube filled with an inert gas) is employed that emits at a specified or designed nominal wave length (or range of wavelengths) at a suitable or sufficient level of emitted flux.

In the photoelectric process the absorption of a photon by a material causes the material to emit an electron. The energy of the photon must exceed the work-function of the material. The work-function of materials is typically in the range 2-6 electron-volts. The energy $\varepsilon$ of a photon is related to its wavelength $\lambda$ through the expression $\varepsilon=hc/\lambda$, where h is Planck's constant, c is the speed of light. In practical units $\varepsilon=1240/\lambda$, where $\varepsilon$ is in units of electron-volts and is $\lambda$ in units of nanometers. To be effective for photoelectron emission the wavelength of light should, therefore, be shorter than a certain value in the range 200-600 nanometers, corresponding to 2-6 electron-volts, with the exact value depending on the specific material.

Further, if the light source is to be located outside the light-transmissive (e.g., glass) envelope of a spark-gap, then the spectral transmission of the envelope should be considered. By way of example, borosilicate glass absorbs strongly at wavelengths less than 300 nanometers, corresponding to an energy of 4 electron-volts. So if, by way of example, a given material has a work-function of 3 electron-volts, and a light source is placed outside the glass envelope to create photoelectrons, then only photons of energy 3-4 electron volts (300-400 nanometers) will be effective. Photons with wavelength longer than 400 nanometers will not have sufficient energy to cause photoemission, and photons with wavelength shorter than 300 nanometers will be absorbed by the glass. Thus, the material to be photo-electrically stimulated, the wavelength of light to be employed, and the transmissive properties of the envelope are all factors to be considered in the design and configuration or a spark gap system as discussed herein. It should be noted that in other embodiments, the light source may be positioned inside of the envelope.

With the preceding in mind, the light source (e.g., a discharge probe having wire electrodes sealed in a tube with inert gas) is located with respect to one of the electrodes (e.g., the cathode and/or the anode) of a spark gap and the emitted photons incident on the surface of the electrode cause it to emit electrons via the photo-electric effect. These electrons are then available to initiate the gas discharge or breakdown event. In accordance with some implementations, the electrode on which photons from the light source are incident and which emits electrons is a conventional electrode (e.g., a conventional conductive metal substrate and surface), as opposed to an electrode having coated surface or other emissive coating (e.g., a special purpose emissive coating) and in contrast to a photoelectrode (e.g., a photocathode or other an annular electrode or coil having a coating or composition specifically for the purpose of emitting electrons in response to light photons). However, in other embodiments, electrodes having a coated surface and/or photoelectrodes may be utilized.

Figure 2:
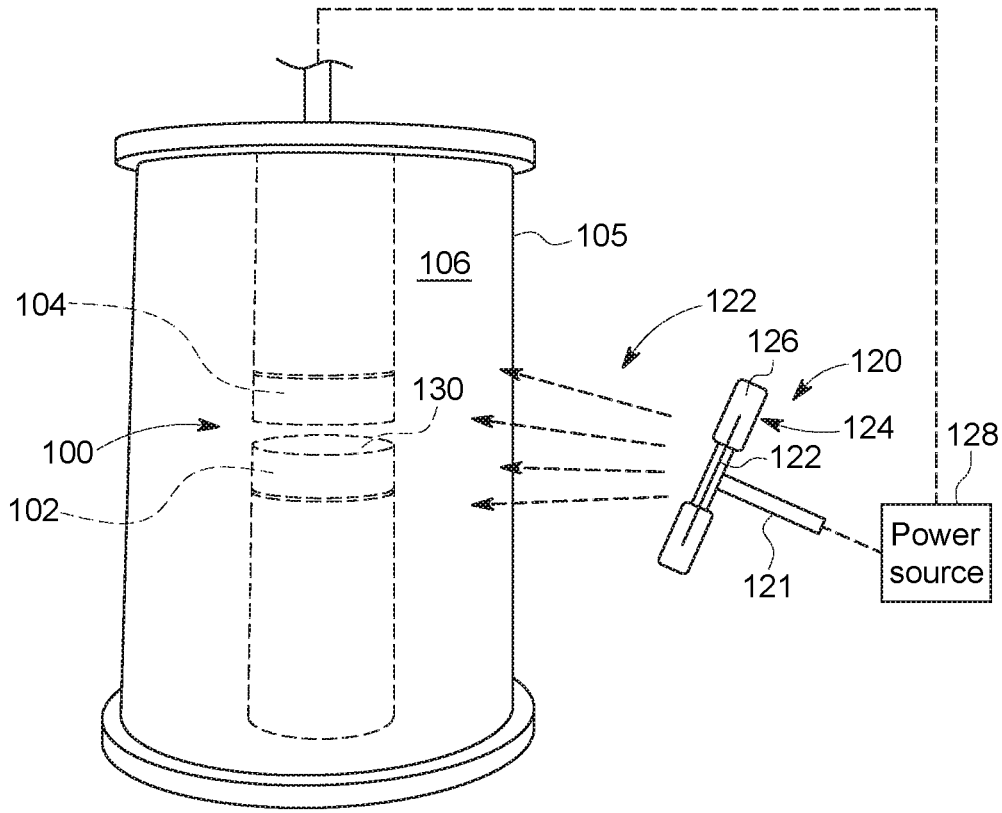
FIG. 2 depicts a spark gap and light source, in accordance with aspects of the present disclosure.

In one implementation, a light source may be used, which may be adjusted so as to find a suitable (or optimal) range of wavelengths and/or light flux for a given spark gap configuration or application. In one embodiment, the light source may be a discharge probe that includes wire electrodes (e.g., two or more electrodes) sealed in an envelope filled with an inert gas (e.g., helium, neon, argon, krypton, xenon, radon, nitrogen, hydrogen, or another suitable inert gas). The discharge probe may be operated at a minimum threshold current that will generate light sufficient to cause the spark gap to breakdown. With the preceding in mind, FIG. 2 depicts an example of a spark gap 100 suitable for use in an ignition system (such as for use in combustion engines), surge protection contexts, or power switching. The spark gap 100 as discussed herein refers to an assembly of a separated pair of electrodes (i.e., anode 102, and cathode 104) within a sealed environment 105 (e.g., a glass envelope or housing) containing a gas mixture 106.

In one implementation, a light source 120 (e.g., a variable light source in combination with a monochrometer) may be employed. In such an example, the light source 120 may be used to assess the effect of wavelength (photon energy) and photon flux on the breakdown voltage of different gaps, and to thereby identify suitable ranges of photon energy and/or flux for different gap types and/or distances. As shown in the illustrated embodiment of FIG. 2, the light source 120 may be a discharge probe 121 that includes electrodes 122 (e.g., two or more wire electrodes) sealed in a tube 124 filled with an inert gas 126 (e.g., nitrogen). In some embodiments, a pressure of the inert gas 126 in the tube 124 may be between 1 Torr and 10 Torr, between 2 Torr and 8 Torr, or between 4 Torr and 6 Torr. In other embodiments, the pressure of the inert gas 126 in the tube 124 may be approximately (e.g., within 5% or within 10% of) 5 Torr.

In some embodiments, the light source may also have the first electron problem. However, the light source 120 may be tuned and/or adjusted based on operating conditions of the spark gap 100 to reduce the first electron problem. For example, the light source 120 may be larger than a gap between the first electrode 102 and the second electrode 104 (e.g., to intercept cosmic rays), the light source 120 may include pointy electrodes (e.g., to encourage field emission), or a gas utilized within the light source 120 may be modified (e.g., so long as a suitable photon wavelength is achieved).

To generate light from the electrodes 122 of the discharge probe, a direct current (DC) voltage may be supplied to the electrodes 122 from a power source 128. The power source 128 may include a voltage source and/or a series "ballasting" resistor to limit a current through the discharge probe. In some cases, the voltage source may be the same voltage source that supplies current to the spark gap 100. As a result, current (e.g., approximately 1 milli-Amp) may flow through inert gas 126 of the discharge probe. In some embodiments, a first electrode 122 of the discharge probe may be coupled to the power source 128 and a second electrode 122 of the discharge probe may be coupled to the first electrode 102, the second electrode 104, or both. In other embodiments, the power source 128 of the light source 120 having the electrodes 122 may be the same as the power source for the electrodes 102 and 104 of the spark gap 100. In some embodiments, an amount of DC voltage supplied to the electrodes 122 from the power source 128 may adjust a wavelength, frequency, and/or amount of energy of the light emitted by the light source. Additionally, the power supply 128 may be configured to apply sufficient voltage to the light source 120 sufficiently before the spark 100 gap is triggered to allow time to create a "first electron" and initiate the light source 120. For example, in some embodiments, the power supply 128 may provide voltage to the light source 120 between 100 milliseconds (ms) and 200 ms before a desired time for the spark gap 100 to fire.

The light source 120 may include various combinations of the inert gas 126, pressures of the inert gas 126, an amount of DC voltage supplied to the electrodes 122, and/or a configuration of the electrodes 122 to produce light having predetermined characteristics (e.g., wavelength, frequency, flux, etc.). For example, in some embodiments, the light source 120 may generate light having a wavelength of between 100 nanometers (nm) and 1000 nm, between 200 nm and 800 nm, or between 300 nm and 500 nm. In some embodiments, the wavelength of the light source 120 may be adjusted by a gas composition within the light source 120, and an intensity of the light source 120 may be adjusted by the power source 128.

In some embodiments, the light source 120 may be positioned inside the sealed environment 105 of the spark gap 100. In other embodiments, the light source 120 may be outside of the sealed environment 105 of the spark gap (e.g., as shown in FIG. 2). For example, the light source 120 may be mounted to an exterior surface of the sealed environment 105 such that the light source 120 directs light (e.g., photons) toward a surface 130 of at least one of the electrodes 102 and/or 104. When photons are emitted from the light source 120 and directed toward the surface 130 of at least one of the electrodes 102 and/or 104 of the spark gap 100, a breakdown event may be initiated in the spark gap 100 by the photo-electric effect.

Utilizing the light source 120 disclosed herein may enable the spark gap to operate over a wide range of temperatures because the spectrum and/or intensity of light emitted by the discharge probe is relatively insensitive to temperature fluctuations. For example, the electrodes 122 of the discharge probe 121 may include a metallic material (e.g., copper, aluminum, tungsten, or another suitable metallic material), which may be configured to withstand relatively high temperatures. Additionally, an operating life of the light source 120 may be enhanced because the current within the discharge probe (e.g., in the tube 124) is relatively low.

Figure 3:
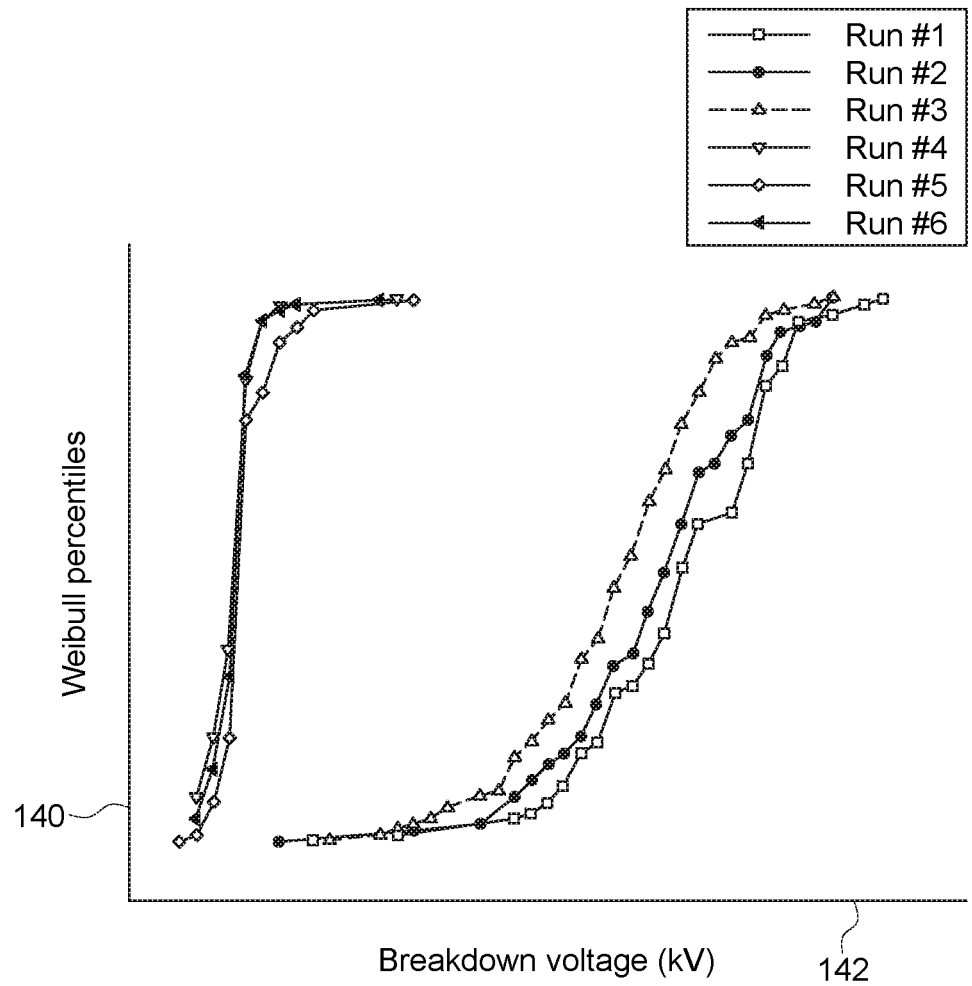
FIG. 3 is a graphical illustration of a performance of spark gaps that include the light source of FIG. 2 compared to a performance of spark gaps that do not include the light source, in accordance with aspects of the present disclosure.

FIG. 3 is a graphical illustration that shows results in terms of breakdown voltage for the spark gap 100 having the light source 120 (e.g., the discharge probe having the electrodes 122 sealed in the tube 124 filled with the inert gas 126) when compared to a spark gap that does not include $^{85}$Kr or the light source 120. As shown in the illustrated embodiment of FIG. 3, three of the spark gaps 100 having the light source 120 (Runs 4-6) were compared to three spark gaps that did not include either the light source 120 or $^{85}$Kr (Runs 1-3). Weibull probabilities of each spark gap are shown on a y-axis 140 and breakdown voltage is shown on an x-axis 142. As used herein, Weibull probabilities may refer to a statistical distribution of a variation in breakdown voltage over a number of operations (e.g., 100 operations) of a given spark gap (e.g., Runs 1-6). As shown in FIG. 3, the spark gaps 100 having the light source 120 (Runs 4-6) generally produced a tight distribution of breakdown voltage, and a tighter distribution of breakdown voltage when compared to the spark gaps that did not include the light source 120 (Runs 1-3).

It should be noted that the present approach is not directed to the reduction of the breakdown voltage, which may be desirable in other contexts. Instead, the present approach is directed to providing a tight distribution of breakdown voltage, particularly in the absence of $^{85}$Kr, by providing "first electrons" in a timely manner as a voltage within the spark gap reaches or exceeds a designed or firing voltage. With this in mind, the present approach relates to the use of a suitable ranges of energy and flux of the photons (as discussed in greater detail below) for application to spark gaps 100.

Figure 4:
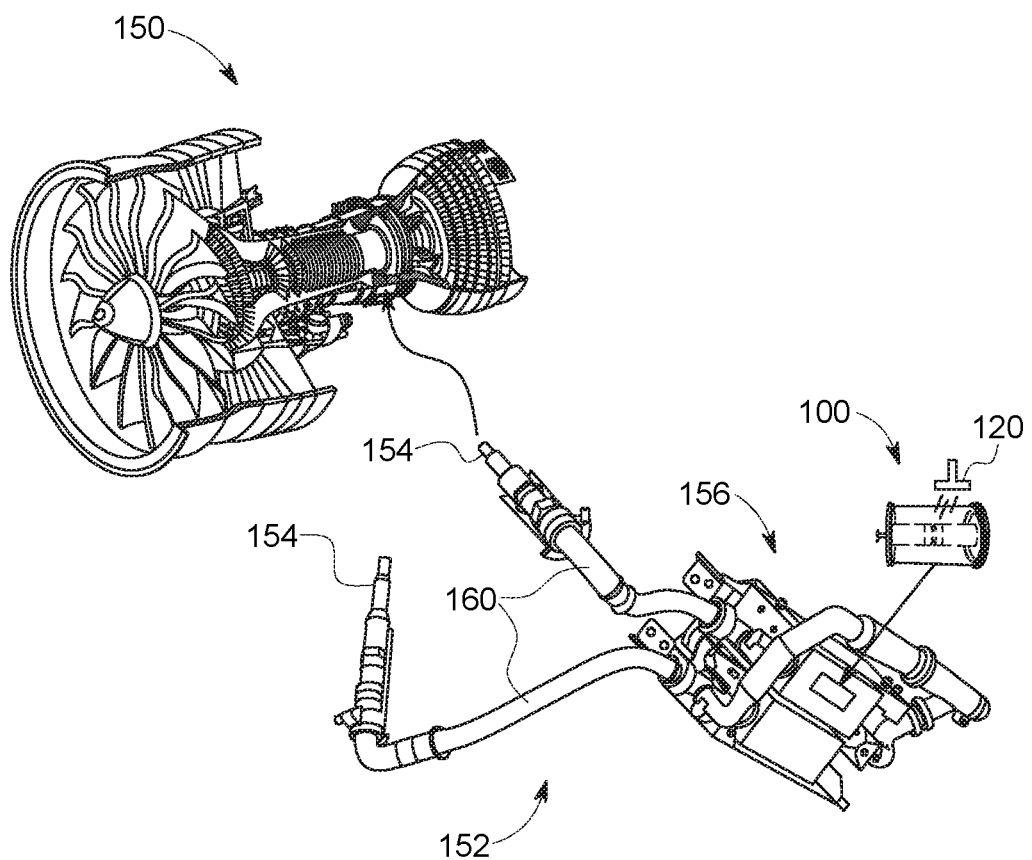
FIG. 4 is an engine, here a jet engine, employing ignition components that include a spark gap as discussed herein and in accordance with aspects of the present disclosure.

With the preceding in mind, FIG. 4 depicts an example of an engine 150, here a jet engine, in which the spark gap 100 using the light source 120 may be employed. For example, the spark gap 100 may be included as part of the fuel ignition system 152 for the engine 150 by which a fuel stream or vapor is combusted. In this example, a spark gap 100 may be provided for one or more igniters 154. For example, each spark gap 100 may be provided as part of an exciter component 156 in communication with a respective igniter 154 via a corresponding lead 160. In this manner, spark events induced at a given spark gap 100 may correspond to a conductive flow between the electrodes of the spark gap 100, causing an ignition event at the corresponding igniter 154 and an ignition event during operation of the engine 150. Though an engine 150 such as that depicted in FIG. 4 is one possible use for a spark gap 100 as discussed herein (e.g., as part of an ignition system), a spark gap 100 as presently disclosed may also be used in other ignition and non-ignition contexts.

Figure 5:
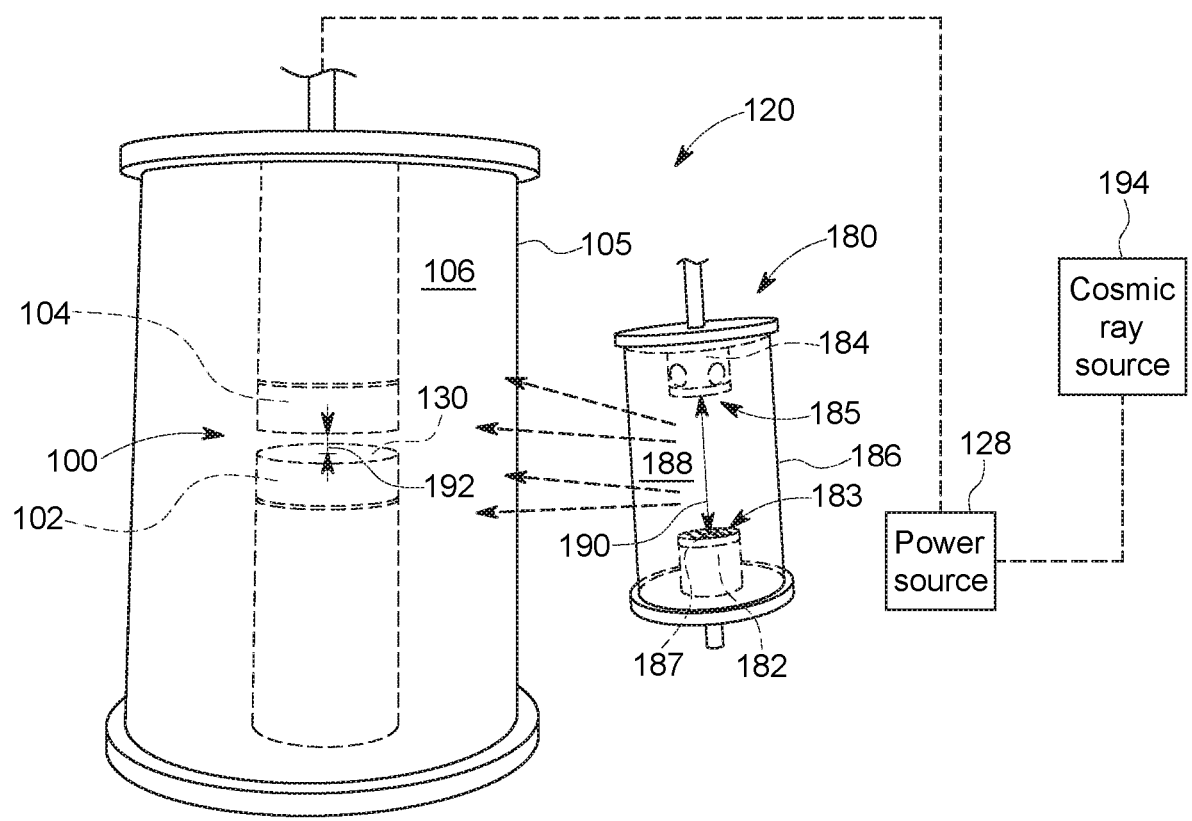
FIG. 5 is a schematic of a spark gap and a light source, in accordance with aspects of the present disclosure.

In some embodiments, the light source 120 may include a discharge tube 180 that includes a similar configuration when compared to the spark gap 100. For instance, FIG. 5 is a schematic of the discharge tube 180 that is utilized as the light source 120 for activating the spark gap 100. As shown in the illustrated embodiment of FIG. 5, the discharge tube 180 includes a first electrode 182 (e.g., an anode) having a first surface 183 and a second electrode 184 (e.g., a cathode) having a second surface 185, where the first surface 183 and the second surface 185 are offset and facing one another. In some embodiments, the first surface 183 and the second surface 185 may include grooves or holes 187 to generate edges of the surfaces 183, 185 that contact the inert gas 188. In some embodiments, the grooves or holes 187 may be machined (e.g., laser machined) into the surfaces 183, 185 to a depth of approximately (e.g., within 10% of, within 5%, or within 1% of) 1 millimeter (mm). In other embodiments, the depth of the surfaces grooves or holes 187 may be between 0.1 mm and 2 mm, between 0.5 mm and 1.5 mm, or between 0.8 mm and 1.2 mm. Further, the grooves or holes 187 may be formed on a target percentage of the surfaces 183, 185. For instance, the grooves or holes 187 may be formed on less than 50%, less than 40%, or less than 30% of a total surface area of the surfaces 183, 185. In any case, the grooves or holes 187 may facilitate generation of a first electron in the discharge tube 180, which may enable a reliable activation of the spark gap 100, thereby avoiding a misfire of the spark gap 100.

The first electrode 182 and the second electrode 184 are both sealed in a tube 186 filled with an inert gas 188 (e.g., helium, neon, krypton, argon, xenon, radon, nitrogen, hydrogen, or a combination thereof). In some embodiments, a pressure of the inert gas 188 in the tube 186 may be between 1 Torr and 10 Torr, between 2 Torr and 8 Torr, or between 4 Torr and 6 Torr. In other embodiments, the pressure of the inert gas 188 in the tube 186 may be approximately (e.g., within 5% or within 10% of) 5 Torr. Additionally or alternatively, the tube 186 of the discharge tube 180 may be substantially the same as the tube 105 of the spark gap 100. As such, the tube 186 may include glass or coated glass to facilitate movement of photons from the electrodes 182, 184 toward the spark gap 100.

In some embodiments, the discharge tube 180 may also have the first electron problem. However, the discharge tube 180 may be tuned and/or adjusted based on operating conditions of the spark gap 100 to reduce the first electron problem. For example, a gap 190 (e.g., distance) between the first electrode 182 and the second electrode 184 of the discharge tube 180 may be larger than a gap 192 (e.g., distance) between the first electrode 102 and the second electrode 104 of the spark gap 100. In some embodiments, the gap 190 may be between 2.5 millimeters (mm) and 25 mm, between 3 mm and 22 mm, or between 6 mm and 12 mm. Additionally or alternatively, the gap 190 may be between 1.5 times and 50 times, between 2 times and 20 times, or between 5 times and 10 times greater than the gap 192 between the electrodes 102, 104 of the spark gap 100. An increased length of the gap 190 may facilitate an ability of the discharge tube 180 to intercept cosmic rays from a cosmic ray source 194.

To generate light from the first electrode 182 and the second electrode 184 of the discharge tube 180, a direct current (DC) voltage may be supplied to the electrodes 182, 184 from the power source 128 (or another suitable power source). In some embodiments, the DC voltage is supplied through a series "ballasting" resistor that limits an amount of current through the discharge tube to a target level. As a result, current (e.g., approximately 1 milli-Amp) may flow through inert gas 188 of the discharge tube 180. In other embodiments, the voltage may be supplied by an alternating current (AC) voltage source, such as a sinusoidal AC waveform, a triangular waveform, or a ramp waveform, so long as the discharge tube 180 is excited when a demand for supply photons to the spark gap 100 is generated. It may be convenient to power the discharge tube 180 from the same voltage source as the spark gap 100, in which case the "ballasting" resistor may be connected in series with the discharge tube 180 and a combination of the discharge tube 180 and "ballasting" resistor are connected in parallel with the spark gap 100. A cosmic ray supplied from the cosmic ray source 194 (e.g., cosmos) may then provide a first electron to the discharge tube 180, thereby initiating a current flow and discharge that generates light. Power to the discharge tube 180 may be supplied continuously, such that when the discharge probe 180 is activated (e.g., excited), the discharge probe 180 may substantially instantaneously supply electrons that may ultimately activate the spark gap 100. Once the spark gap 100 reaches a firing voltage (e.g., when the power source 128 supplies a sufficient amount of voltage to at least one of the electrodes 102, 104), photons emitted by the active discharge tube 180 may excite and activate the spark gap 100 without a significant delay. In other words, when the discharge tube 180 is activated, the spark gap 100 may subsequently be activated at substantially the moment when the voltage meets or exceeds a target voltage supplied to at least one of the electrodes 102, 104.

In other embodiments, the power supply 128 may be configured to apply a voltage to the discharge tube 180 sufficiently before the spark gap 100 is triggered to allow time to initiate the discharge tube 180. For example, the power supply 128 may provide voltage to the discharge tube 180 between 100 milliseconds (ms) and 500 ms before a desired time for the spark gap 100 to fire. In still further embodiments, the power supply 128 may provide voltage to both the spark gap 100 and the discharge tube 100 at substantially the same time. Additionally or alternatively, the discharge tube 180 may be maintained in the activated state once the discharge tube 180 is activated.

In some embodiments, an amount of DC voltage supplied to the electrodes 182, 184 from the power source 128 may adjust a wavelength, frequency, and/or amount of energy of the light emitted by the light source 120. The discharge tube 180 may include various combinations of the inert gas 188, pressures of the inert gas 188, an amount of DC voltage supplied to the electrodes 182, 184, and/or a configuration of the electrodes 182, 184 to produce light having predetermined characteristics (e.g., wavelength, frequency, flux, etc.). For example, in some embodiments, the discharge tube 180 may generate light having a wavelength of between 100 nanometers (nm) and 1000 nm, between 200 nm and 800 nm, or between 300 nm and 500 nm. In some embodiments, the wavelength of the discharge tube 180 may be adjusted by a gas composition within the discharge tube 180, and an intensity of the discharge tube 180 may be adjusted by the power source 128.

The inert gases 188 that are used to create a plasma in the discharge tube 180 can efficiently emit high energy photons (vacuum ultraviolet photons ("VUV")) with energies in excess of 10 electronvolts (eV). In some cases, the VUV photons will be absorbed by glass walls of the discharge tube 180. However, by utilizing phosphor (e.g., a phosphor powder that adheres to glass of the discharge tube 180) in the discharge tube 180, the VUV photons may be reemitted at much lower energies (e.g., approximately 3.5 eV), which may be used in the photoemission process of the spark gap 100. One example of such a phosphor that may be utilized in the discharge tube 180 is strontium fluoroborate ($SrB_4O_7F$) doped with europium ($Eu^{2+}$), which can convert the VUV photons to approximately 370 nm.

Krypton generates photons in the 100-120 nanometer (nm) range. Similarly, argon emits photons in the 90-110 nm range. As such, krypton and argon may be utilized within the discharge tube 180 to produce light at a sufficient wavelength to ignite the spark gap 100. Further, excitation of phosphor with the VUV photons may generate a broadband spectrum between 350-400 nm, which can also be efficiently used for ignition of the spark gap 100.

As shown in the illustrated embodiment of FIG. 5, the discharge tube 180 may be positioned outside of the sealed environment 105 of the spark gap 100 and positioned proximate to the spark gap 100. For example, the discharge tube 180 may be mounted to an exterior surface of the sealed environment 105 such that the discharge tube 180 directs light (e.g., photons) toward the surface 130 of at least one of the electrodes 102, 104. In other embodiments, the discharge tube 180 may be positioned inside the sealed environment 105 of the spark gap 100. When photons are emitted from the discharge tube 180 and directed toward the surface 130 of at least one of the electrodes 102, 104, a breakdown event may be initiated in the spark gap 100 by the photo-electric effect.

Utilizing the discharge tube 180 disclosed herein may enable the spark gap to operate over a wide range of temperatures because the spectrum and/or intensity of light emitted by the discharge tube 180 is relatively insensitive to temperature fluctuations. For example, the electrodes 182, 184 of the discharge tube 180 may include a metallic material (e.g., copper, aluminum, tungsten, or another suitable metallic material), which may be configured to withstand relatively high temperatures. In some embodiments, the discharge tube 180 may provide a photon to the spark gap 100 at temperatures between −200 degrees Celsius (° C.) and 300° C., between −150° C. and 200° C., or between −100° C. and 150° C. Additionally, an operating life of the discharge tube 180 may be enhanced because the current within the discharge tube 180 is relatively low.

Technical effects of the invention include an alternative approach to generating seed electrons at a spark gap, allowing $^{85}$Kr to be eliminated from the gas mixture typically present at the spark gap while maintaining the same performance and function of the device. The present approach utilizes the photo-electric effect, using a light source with a specific nominal wave length (or range of wavelengths) at a specific level of emitted flux to generate seed electrons. The light source (e.g., a discharge probe that includes electrodes in a sealed tube filled with inert gas) is located with respect to a surface of one of the electrodes (e.g., the cathode) of a spark gap and the emitted photons landing incident on the surface of the electrode causes it to emit electrons needed to initiate the gas discharge or breakdown event. The present approach may be retrofit in existing packaging, such that there would be no major changes in the manufacturing of the spark gap 100 or the remainder of the ignition system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A spark gap device, comprising:
a first electrode having a first surface;
a second electrode having a second surface offset from the first surface by a first distance; and
a discharge tube comprising a third electrode and a fourth electrode, wherein the discharge tube is configured to emit light toward at least the first surface such that photons emitted by the discharge tube when the spark gap device is operated are incident on the first surface and cause electron emission from the first surface, wherein the third electrode is offset from the fourth electrode by a second distance, and wherein the second distance is greater than the first distance.

2. The spark gap device of claim 1, wherein the second distance is between 5 times and 50 times greater than the first distance.

3. The spark gap device of claim 1, wherein the third electrode and the fourth electrode are disposed in a sealed tube comprising an inert gas.

4. The spark gap device of claim 3, wherein a pressure of the inert gas in the sealed tube is approximately 5 Torr.

5. The spark gap device of claim 1, wherein the discharge tube comprises a power source configured to supply a voltage to the third electrode.

6. The spark gap device of claim 5, wherein the power source is configured to supply another voltage to the first electrode.

7. The spark gap device of claim 1, wherein the discharge tube is configured to emit the light toward the second surface.

8. The spark gap device of claim 1, wherein the first electrode and the second electrode are disposed in a sealed envelope.

9. The spark gap device of claim 8, wherein the discharge tube is positioned exterior and proximate to the sealed envelope.

10. The spark gap device of claim 1, wherein the spark gap device does not include a radioactive component.

11. An ignition device, comprising: one or more igniters configured to ignite a fuel stream or vapor during operation; and one or more exciter components, each exciter component of the one or more exciter components connected to a respective igniter of the one or more igniters, wherein each exciter component of the one or more exciter components comprises a respective spark gap and a respective discharge tube, wherein each discharge tube comprises a respective first electrode having a respective first surface and a respective second electrode having a respective second surface, wherein each second surface is offset from and facing each first surface by a first distance, wherein each spark gap comprises a respective third electrode having a respective third surface and a respective fourth electrode having a respective fourth surface, wherein each third surface is offset from each fourth surface by a second distance, wherein the first distance is greater than the second distance, and wherein each discharge tube is configured to generate free electrons to activate each spark gap.

12. The ignition device of claim 11, comprising a power source configured to supply a voltage to each first electrode.

13. The ignition device of claim 11, wherein each discharge tube is configured to emit light toward at least each third surface such that photons emitted by each discharge tube when each spark gap is operated are incident on each third surface and cause electron emission from each third surface.

14. The ignition device of claim 11, wherein each first electrode and each second electrode of each discharge tube are disposed in a respective sealed tube filled with an inert gas.

15. The ignition device of claim 14, wherein the inert gas is nitrogen.

16. The spark gap device of claim 15, wherein a pressure of the inert gas in each sealed tube is approximately 5 Torr.

17. The ignition device of claim 11, wherein each spark gap does not include a radioactive component.

18. A spark gap device, comprising:
a spark gap, comprising:
 a first tube;
 a first electrode disposed in the first tube, wherein the first electrode comprises a first surface; and
 a second electrode disposed in the first tube, wherein the second electrode comprises a second surface offset from the first surface by a first distance; and
a discharge tube disposed external to the first tube, wherein the discharge tube is configured to emit photons toward at least the first surface such that the photons are incident on the first surface and cause electron emission from the first surface when the spark gap is in operation, wherein the discharge tube comprises:
 a second tube;
 a third electrode disposed in the second tube; and
 a fourth electrode disposed in the second tube, wherein the fourth electrode is offset from the third electrode by a second distance, and wherein the second distance is greater than the first distance.

19. The method of claim 18, wherein the photons are not generated by a radioactive isotope.

20. The method of claim 18, wherein the third tube comprises an inert gas.

* * * * *